(12) United States Patent
Herring (10) Patent No.: US 7,549,289 B2
(45) Date of Patent: Jun. 23, 2009

(54) HYBRID ENGINE

(76) Inventor: John Alexander Herring, 423 Middle Street, Cambridge, Ontario (CA) N3H 3Z7

( * ) Notice: Subject to any disclaimer, the term of this patent is extended or adjusted under 35 U.S.C. 154(b) by 484 days.

(21) Appl. No.: 11/414,271

(22) Filed: May 1, 2006

(65) Prior Publication Data

US 2006/0242960 A1    Nov. 2, 2006

Related U.S. Application Data

(60) Provisional application No. 60/676,305, filed on May 2, 2005.

(51) Int. Cl.
    *F01B 29/10* (2006.01)
(52) U.S. Cl. .............. 60/519; 60/525; 60/526
(58) Field of Classification Search ............ 60/517, 60/519, 525, 526
    See application file for complete search history.

(56) References Cited

U.S. PATENT DOCUMENTS

| 2,988,065 | A |   | 6/1961 | Wankel et al. |  |
|---|---|---|---|---|---|
| 3,488,945 | A | * | 1/1970 | Kelly | 60/519 |
| 3,509,718 | A |   | 5/1970 | Fezer et al. |  |
| 4,009,573 | A | * | 3/1977 | Satz | 60/519 |
| 4,103,491 | A | * | 8/1978 | Ishizaki | 60/519 |
| 5,211,017 | A | * | 5/1993 | Pusic | 60/519 |
| 6,109,040 | A |   | 8/2000 | Ellison, Jr. et al. |  |
| 6,352,063 | B1 |   | 3/2002 | Weslake-Hill |  |
| 2005/0000213 | A1 | * | 1/2005 | Cameron | 60/517 |

* cited by examiner

*Primary Examiner*—Hoang M Nguyen
(74) *Attorney, Agent, or Firm*—Borden Ladner Gervais LLP; Jeffrey W. Wong (57) ABSTRACT

A rotary Wankel-Stirling machine operating upon a compressible working fluid, having a rotary expander having a hot side housing with a heat input interface, a hot side rotor having rotor passages adapted to allow passage of the working fluid between the rotor hub and rotor face, heated chambers formed between the rotor face and the hot side housing, a rotary compressor having a cold side housing with a heat rejection interface, a cold side rotor having rotor passages adapted to allow passage of the working fluid between the rotor hub and rotor face, cooled chambers formed between the rotor face and the cold side housing, a shaft, adapted to rotatably couple the rotor hub of the hot side rotor and the rotor hub of the cold side rotor, the shaft having shaft passages adapted to allow passage of the working fluid between the heated chambers and the cooled chambers, and the working fluid sealed in the machine, wherein the machine operates under the Carnot cycle. The rotary Wankel-Stirling machine may be operated as an engine or a heat pump.

18 Claims, 13 Drawing Sheets

FIG. 5
STARTING POSITION:
0° SHAFT ROTATION
0° ROTOR ROTATION

FIG. 6
45° SHAFT ROTATION
15° ROTOR ROTATION

FIG. 7
90° SHAFT ROTATION
30° ROTOR ROTATION

FIG. 8
135° SHAFT ROTATION
45° ROTOR ROTATION

FIG. 9
180° SHAFT ROTATION
60° ROTOR ROTATION

FIG. 10
225° SHAFT ROTATION
75° ROTOR ROTATION

FIG. 11
270° SHAFT ROTATION
90° ROTOR ROTATION

FIG. 12
315° SHAFT ROTATION
105° ROTOR ROTATION

FIG. 13
360° SHAFT ROTATION
120° ROTOR ROTATION

FIG. 14
135° SHAFT ROTATION
405° ROTOR ROTATION

FIG. 15
450° SHAFT ROTATION
150° ROTOR ROTATION

FIG. 16
495° SHAFT ROTATION
165° ROTOR ROTATION

FIG. 17
540° SHAFT ROTATION
180° ROTOR ROTATION

FIG. 18
585° SHAFT ROTATION
195° ROTOR ROTATION

FIG. 19
630° SHAFT ROTATION
210° ROTOR ROTATION

FIG. 20
675° SHAFT ROTATION
225° ROTOR ROTATION

FIG. 21
720° SHAFT ROTATION
240° ROTOR ROTATION

FIG. 22
765° SHAFT ROTATION
255° ROTOR ROTATION

FIG. 23
810° SHAFT ROTATION
270° ROTOR ROTATION

FIG. 24
855° SHAFT ROTATION
285° ROTOR ROTATION

FIG. 25
900° SHAFT ROTATION
300° ROTOR ROTATION

FIG. 26
945° SHAFT ROTATION
315° ROTOR ROTATION

FIG. 27
990° SHAFT ROTATION
330° ROTOR ROTATION

FIG. 28
1035° SHAFT ROTATION
345° ROTOR ROTATION

HYBRID ENGINE

REFERENCE TO RELATED APPLICATION

This is a formal patent application based on and claiming the benefit of U.S. provisional patent application No. 60/676,305, filed May 2, 2005.

FIELD OF THE INVENTION

The present invention relates generally to rotary piston machines. More particularly, the present invention relates to a hydrid Stirling-Wankel closed-loop machine utilizing internal ducting of the working fluid. It may be used as an engine or as a heat pump.

BACKGROUND OF THE INVENTION

Wankel machines are well known in the art, as were first described in U.S. Pat. No. 2,988,065 to Wankel.

Stirling machines are well known in the art, and operate on the basis of closed-loop compression and expansion of a compressible working fluid. The basic elements of a Stirling machine include an expander, a compressor, heat input, heat rejection, and regenerators. The regenerators act as a thermal capacitor to accept and reject heat from or to the working fluid as it transfers between the compressor and the expander, to increase efficiency.

U.S. Pat. No. 3,509,718 to Fezer et al. teaches a hot gas machine having first and second epitrochoidal housings, each containing rotatable triangular pistons having their interior divided into piston chambers, one housing/piston forming hot chambers and the other housing/piston forming cold chambers. The pistons rotatable on an eccentric shaft while being interconnected by double wall pipe means, the double wall pipe means allowing fluid communication between the hot chambers and the cold chambers. The double wall pipe means may also have regenerator means within an annular intermediate section.

Current designs in Wankel type machines involve inlet and outlet ports in the housing. These designs may result in significant counter-rotation force or shock pressure as the pressurized chambers pass over the inlet and outlet ports.

U.S. Pat. No. 6,109,040 to Ellison et al. teaches a stirling cycle refrigerator or engine employing a rotary wankel mechanism incorporating two Wankel rotary pistons, each in a housing only having two ports and interconnected by only two separate oscillating-flow, closed-cycle regenerative passages.

SUMMARY OF THE INVENTION

It is an object of the present invention to obviate or mitigate at least one disadvantage of previous Stirling-Wankel machines.

In a first aspect, the present invention provides a rotary Wankel-Stirling machine operating upon a compressible working fluid, having a rotary expander having a hot side housing with a heat input interface, a hot side rotor having rotor passages adapted to allow passage of the working fluid between the rotor hub and rotor face, heated chambers formed between the rotor face and the hot side housing, a rotary compressor having a cold side housing with a heat rejection interface, a cold side rotor having rotor passages adapted to allow passage of the working fluid between the rotor hub and rotor face, cooled chambers formed between the rotor face and the cold side housing, a shaft, adapted to rotatably couple the rotor hub of the hot side rotor and the rotor hub of the cold side rotor, the shaft having shaft passages adapted to allow passage of the working fluid between the heated chambers and the cooled chambers, and the working fluid sealed in the machine, wherein the machine operates under the Carnot cycle. Preferably the hot side housing and the cold side housing are relatively offset by a housing angle. Preferably, the housing angle is 45 degrees. Preferably, the crankshaft comprises an eccentric hot side lobe for receiving the hot side rotor and a n eccentric cold side lobe for receiving the cold side rotor. Preferably, the hot side lobe and the cold side lobe are relatively offset by a lobe angle. Preferably, the lobe angle is substantially 180 degrees. Preferably, the machine further includes a rotating union adapted to interface between the rotor hub of the hot side rotor and the shaft, the rotating union adapted to provide a substantially continuous passage between the rotor passages and the shaft passages, and a rotating union adapted to interface between the rotor hub of the cold side rotor and the shaft, the rotating union adapted to provide a substantially continuous passage between the rotor passages and the shaft passages.

Preferably, the hot side housing and the cold side housing have outer walls described by an epitrochoidal arc with "n" number of lobes. Preferably, the machine contains two rotors, each having n+1 rotor faces. Preferably, n=2. Preferably, the rotors rotate about the offset lobes of the shaft at 1/n times the rate that the crankshaft rotates within the machine. Preferably, the shaft, rotors, and housings are adapted to sealingly form n+1 separate volumes of the working fluid that do not mix or exchange during operation of the machine. Preferably, the machine is adapted to operate as an engine or as a heat pump. Preferably, the machine further comprising a regenerative matrix within the shaft passages. Preferably, the regenerative matrix comprises metal pellets, screen, or steel wool.

Preferably, the cooled chambers and heated chambers are of different sizes, proportion, or configuration. Preferably, the machine includes a plurality of cooled chambers, heated chambers, hot side rotors, and cold side rotors. Preferably the rotor faces are convex.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides an Wankel rotary thermodynamic machine operating on the Carnot Cycle as a Stirling machine.

Referring generally to FIGS. 1-4, and FIG. 29, the preferred embodiment of the machine 10 has a hot side housing 20 and a cold side housing 80.

The hot side housing 20 receives heat by a heat input interface 30 and encloses a hot side rotor 40 having rotor passages 50 extending between a rotor hub 60 and a rotor face 70. Preferably, the rotor passages 50 extend through or along the side or sides of the hot side rotor 40. The hot side housing 20 encloses the hot side rotor 40 forming heated chambers 75.

The cold side housing 80 rejects heat by a heat rejection interface 90 and encloses a cold side rotor 100 having rotor passages 110 extending between a rotor hub 120 and a rotor face 130. Preferably, the rotor passages 110 extend through or along the side or sides of the cold side rotor 100. The cold side housing 80 encloses the cold side rotor 100 forming cooled chambers 135.

Preferably a temperature differential is maintained between the heated chambers 75 and the cooled side chambers 135 by heating the heated chambers 75 or cooling the cooled chambers 135 or heating the heated chambers 75 and cooling the cooled chambers 135.

A shaft 140 couples the hot side rotor 40 and the cold side rotor 100. Preferably the shaft 140 is a crankshaft. The shaft 140 includes shaft passages 150 which allow passage of a working fluid between the heated chambers 75 and the cooled chambers 135. In the preferred embodiment, the working fluid can flow from the heated chambers 75, from the rotor face 70, through the rotor passages 50, to the rotor hub 60 of the hot side rotor 40, through the shaft passages 150 of the shaft 140 and through the rotor hub 120, through the rotor passages 110, to the rotor face 130 of the cold side rotor 100, and to the cooled chambers 135. The working fluid may also flow in the opposite direction. Preferably the shaft passages 150 are three distinct conduits extending between the heated chambers 75 and the cooled chambers 135. Preferably the shaft passages 150 are three distinct conduits routed and extending between the heated chambers 75 and the cooled chambers 135 to provide increased or maximum efficiency.

The hot side rotor 40 connects with the shaft 140 at an eccentric hot side lobe 170 to provide the desired operation. Similarly, the cold side rotor 100 connects with the shaft 140 at an eccentric cold side lobe 180 to provide the desired operation. In the preferred embodiment, there is 180 degrees between the hot side lobe 170 and the cold side lobe 180.

Figure 1:
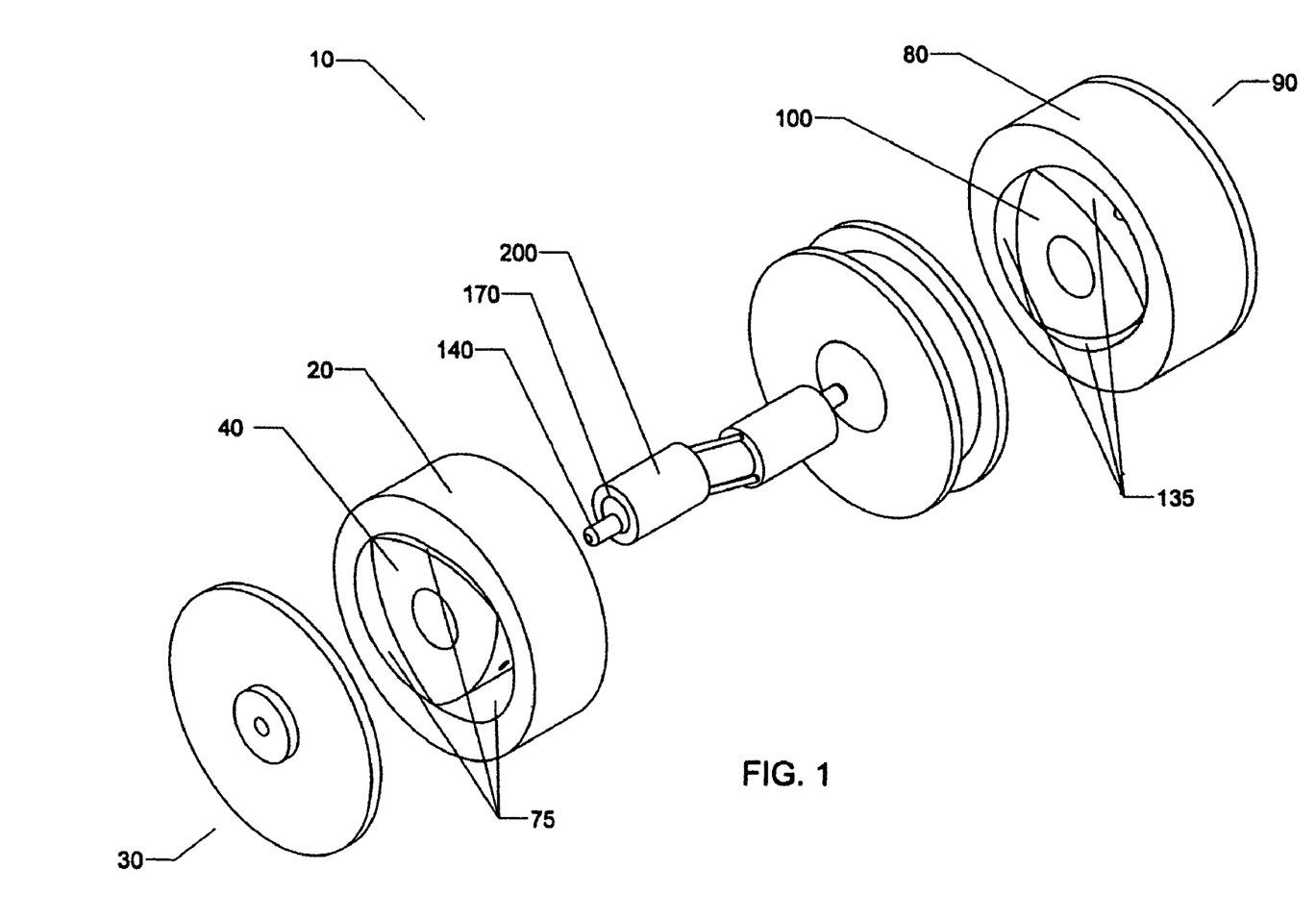
FIG. 1 is an exploded perspective view of an exemplary machine of the present invention.
Figure 2:
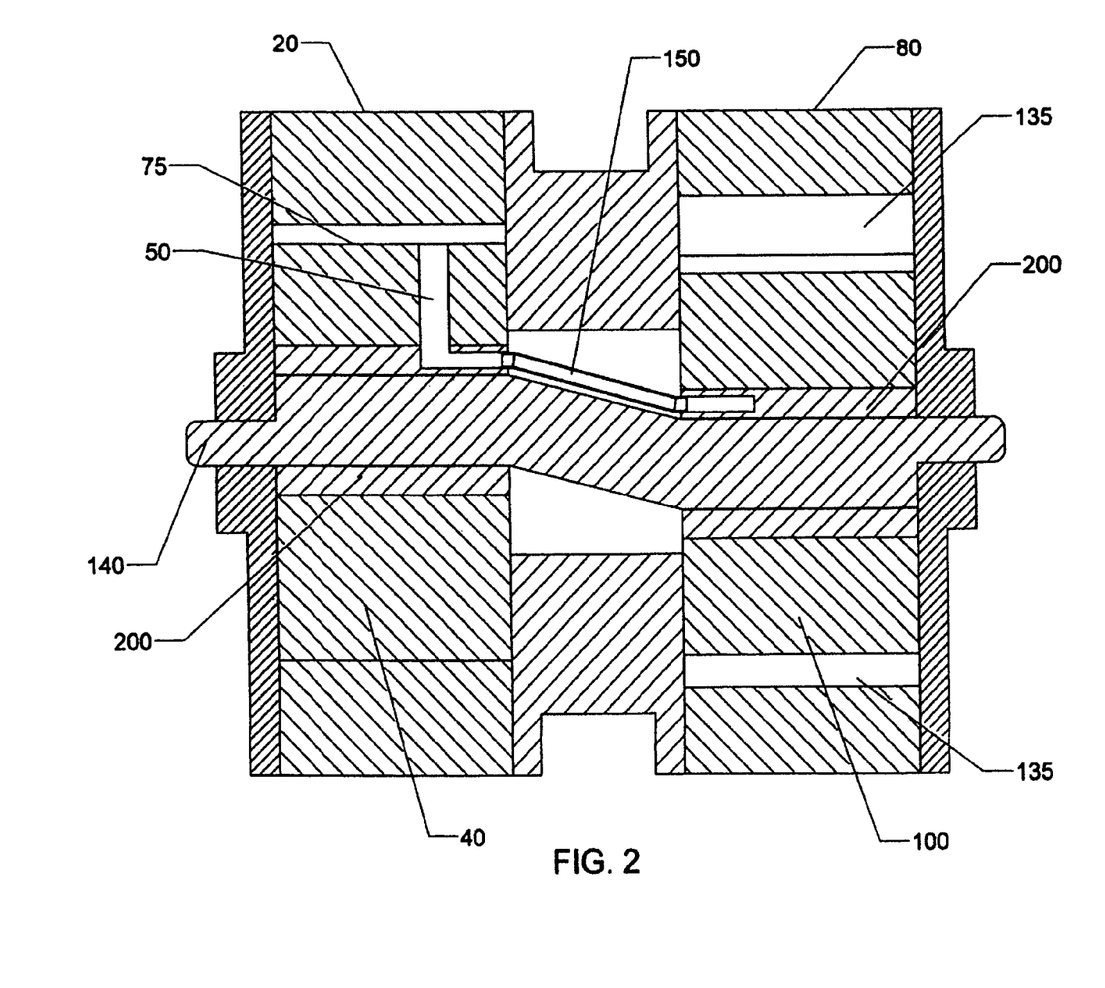
FIG. 2 is a cross-section of the machine.
Figures 3A, 3B, 3C:
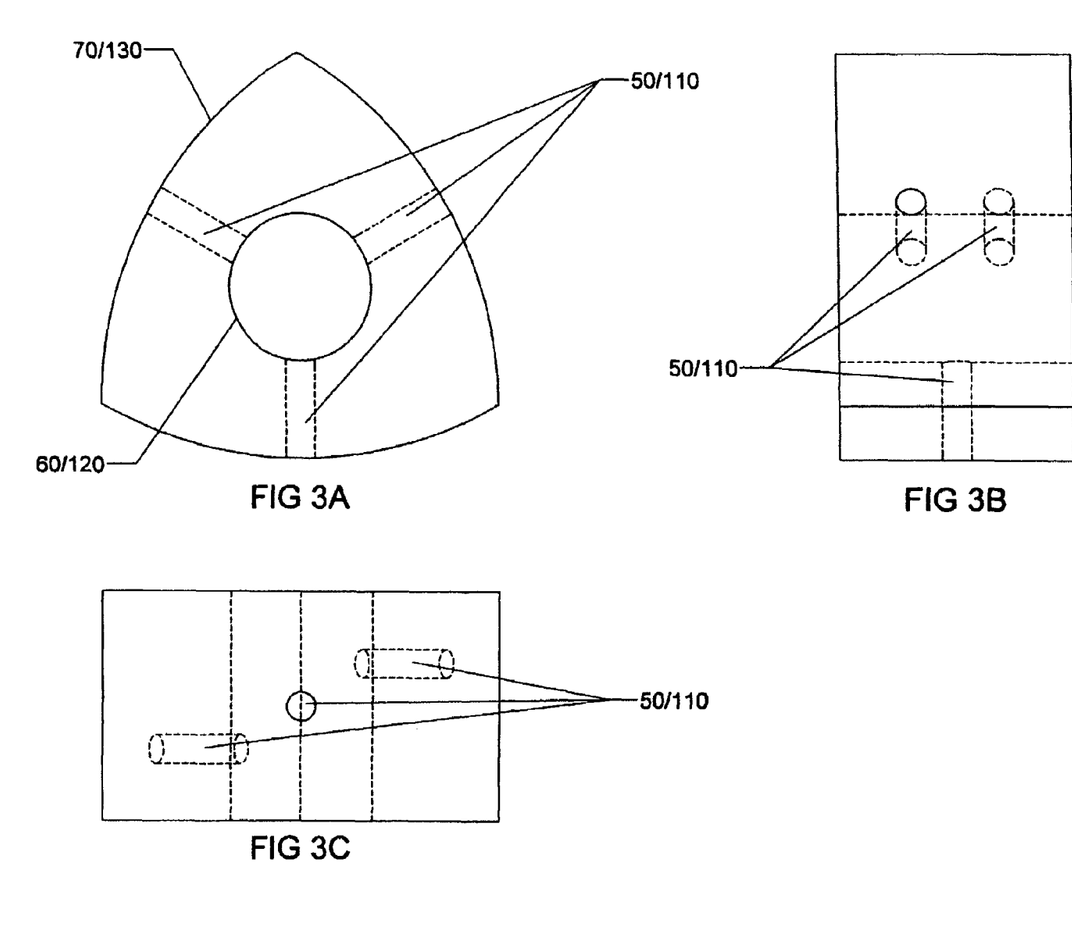
FIGS. 3A-3C are end and corresponding side views of a rotor of the machine.

A rotating union 200 or rotating seal interfaces between the shaft 140 and the hot side rotor 40 and between the shaft 140 and the cold side rotor 100. The rotating union provides a passage between the respective rotor and the shaft 140. The rotating union may be configured to provide a substantially continuous passage or in a variant it may be configured to provide a variably open passage, opening and closing throughout relative rotation of the shaft 140 and the rotating union 200 throughout the cycle to operate or improve efficiency or improve operation of the machine 10.

In a variant, the passages or any one of them, e.g. the rotor passages 50, the shaft passages 150 and/or the rotor passages 110 may be appropriately heated or cooled to operate or improve operation or improve efficiency of the machine 10.

The heated chambers 75 and the cooled chambers 135 may be different sizes, proportions, or configurations.

Figure 4:
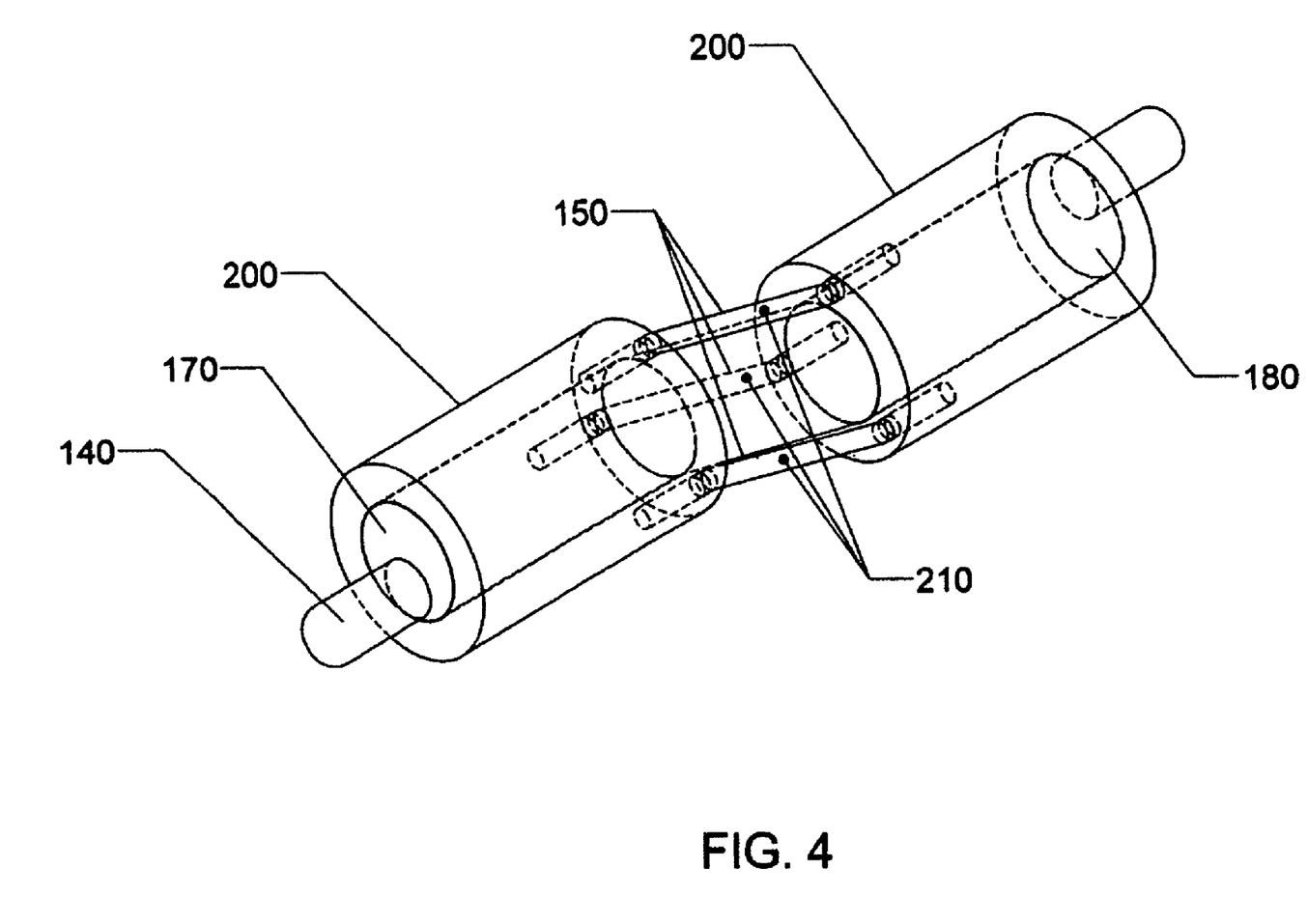
FIG. 4 is a perspective view of the crankshaft of the machine.

In the preferred embodiment, a regenerative matrix 210 is associated with the shaft passages 150 of the shaft 140. The regenerative matrix 210 may include metal pellets, screen, steel wool, or other regenerative materials known in the art.

As shown, in the preferred embodiment, there is a relative housing angle between the hot side housing 20 and the cold side housing 80 of 45 degrees. In order to operate, an Alpha type Stirling engine needs to have a 90 degree phase difference between the hot side and the cold side of the machine. In the preferred embodiment, the epitrochoid shape in this machine has two lobes, the volume of gas will reach a minimum and maximum twice in one rotation of the rotor. Therefore one rotation of the rotor equals 720 degree of the Carnot Cycle. In ratio, the required 90 degree of Carnot cycle are equal to 45 degree of rotor rotation within the epitrochoidal chamber. Thus, to accomplish this and to keep the crankshaft balanced (i.e. with lobes 180 degrees apart), the chambers have been assembled at a 45 degree angle to each other.

Process of Operation:

Referring generally to FIGS. 5-28, operation of the machine as an engine is described through one cycle. Although air is mentioned as the preferred working fluid, a wide variety of working fluids, known in the art, may be used. Although described as an engine, the machine may also be operated as a heat pump.

Figure 5:
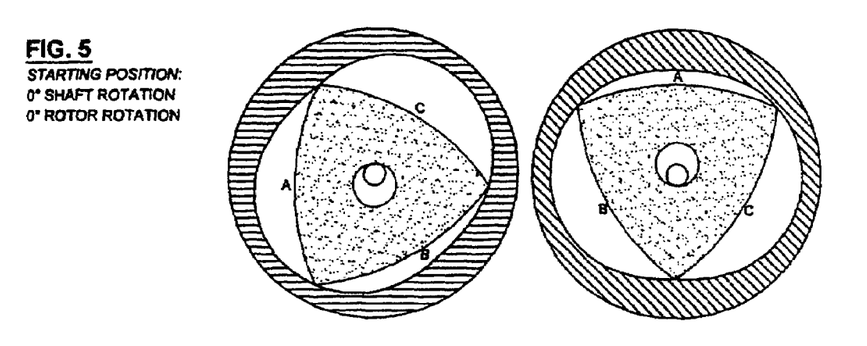
FIGS. 5-28 are cross-sectional views illustrating the cyclic operation of the machine through 360° of rotor rotation, as more particularly described in the detailed description below.

The process begins with heat being applied to the Hot Side Housing 20 and/or heat being removed from the Cold Side Housing 80 in a manner that produces a temperature differential between the two housings. At any given point in the cycle one air mass will be exposed more to the hot or cold side of the engine. The resulting difference in pressure between the air masses will cause the engine to turn.

FIG. 5 shows a starting position, with Air mass 'A' about to begin the Compression Heating portion of the Carnot Cycle.

Figure 6:
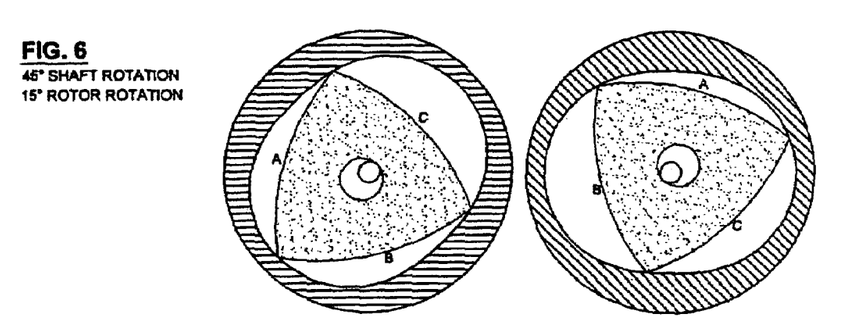

FIG. 6 shows the crankshaft rotated through 45°. At this point air mass 'C' completes the Expansion Cooling portion of the Carnot cycle, and begins Power Contraction.

Figure 7:
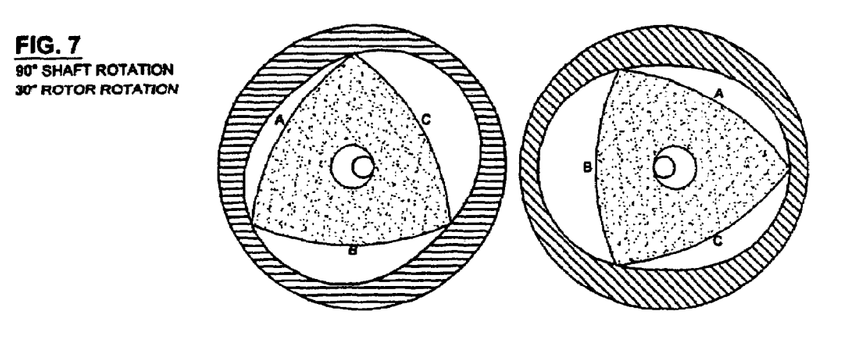

FIG. 7 shows the crankshaft rotated another 45° to 90° from the start point. Air mass 'B' finishes Power Expansion and begins Expansion Cooling.

Figure 8:
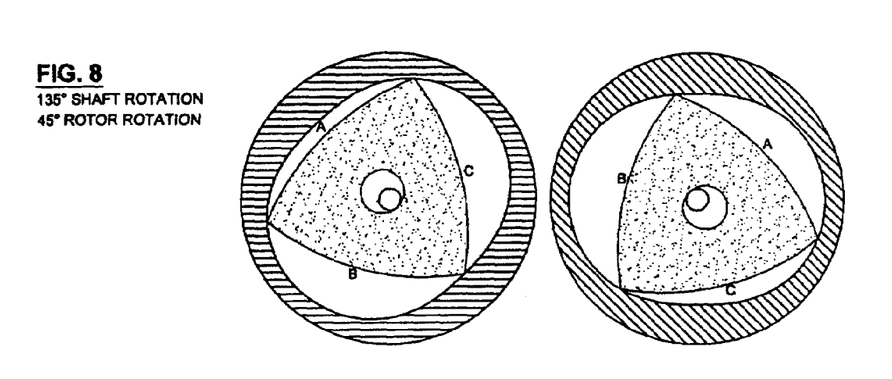

FIG. 8 shows the crankshaft rotated another 45°. Air mass 'A' completes Compression Heating and begins Power Expansion.

Figure 9:
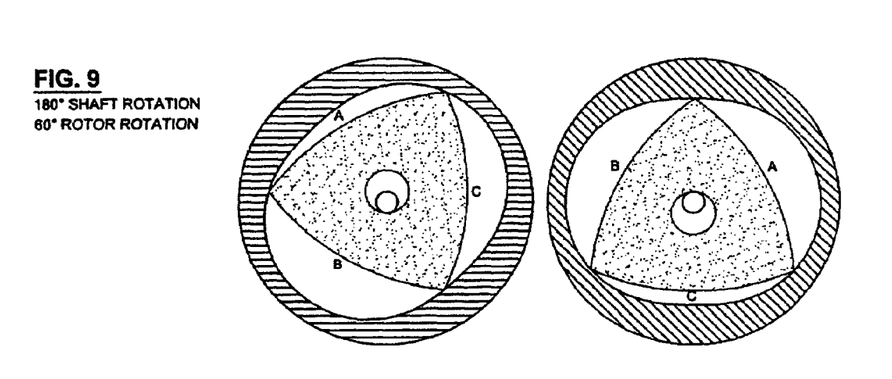

FIG. 9 shows the crankshaft rotated another 45°. It is now 180° from the starting position. Air mass 'C' finishes Power Contraction and begins Compression Heating.

Figure 10:
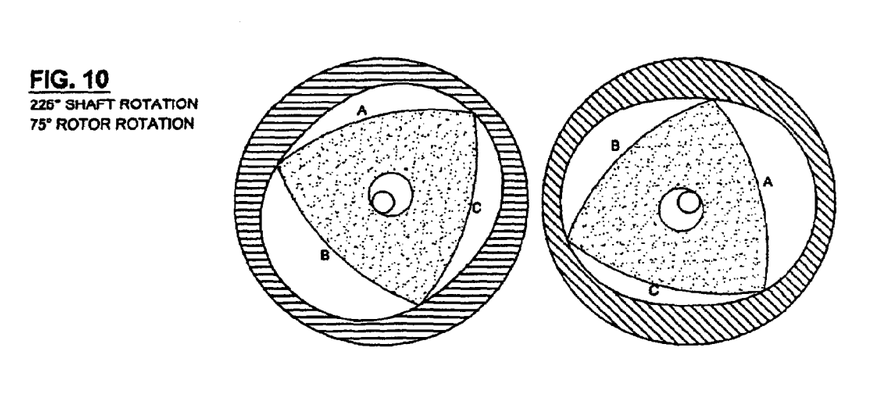

FIG. 10 shows the Crankshaft (3) rotated through 45°. At this point air mass 'B' completes the Expansion Cooling portion of the Carnot cycle, and begins Power Contraction.

Figure 11:
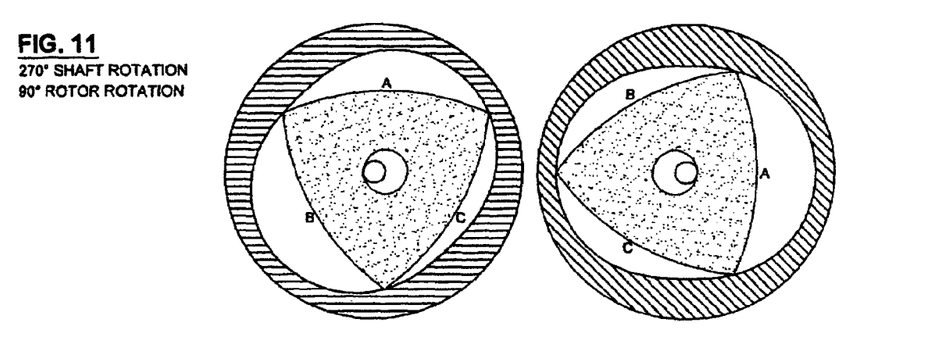

FIG. 11 shows the crankshaft rotated another 45°. Air mass 'A' finishes Power Expansion and begins Expansion Cooling.

Figure 12:
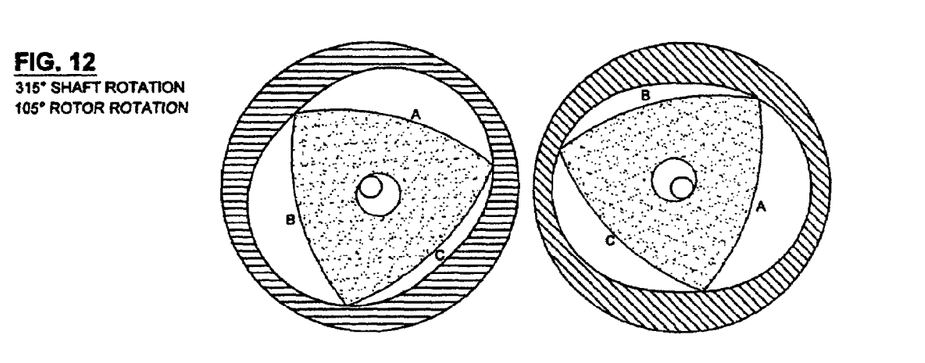

FIG. 12 shows the crankshaft rotated another 45°. Air mass 'C' completes Compression Heating and begins Power Expansion.

Figure 13:
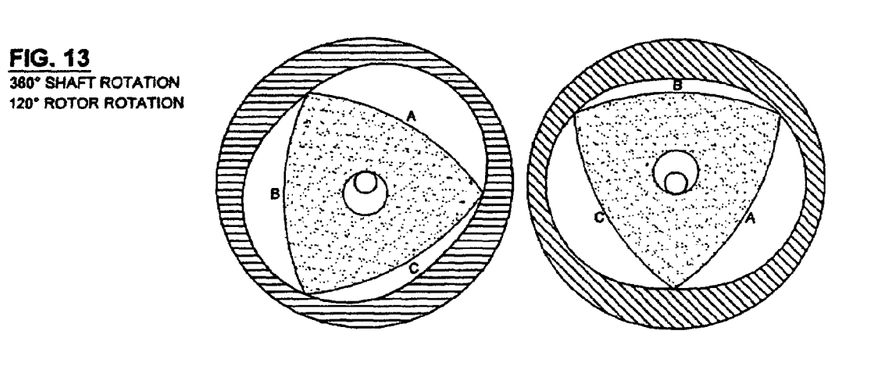

FIG. 13 shows the crankshaft rotated another 45° and is now back to the starting position. The rotors have rotated 120° relative to the chambers. Air mass 'B' finishes Power Contraction and begins Compression Heating.

Figure 14:
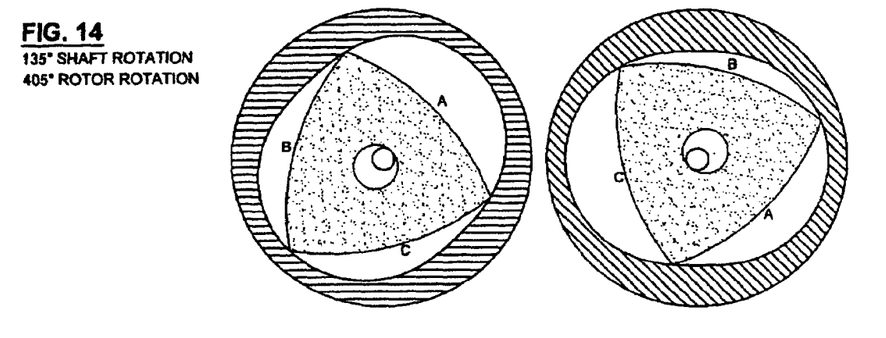

FIG. 14 shows the crankshaft rotated another 45°. At this point air mass 'A' completes Expansion Cooling and begins Power Contraction.

Figure 15:
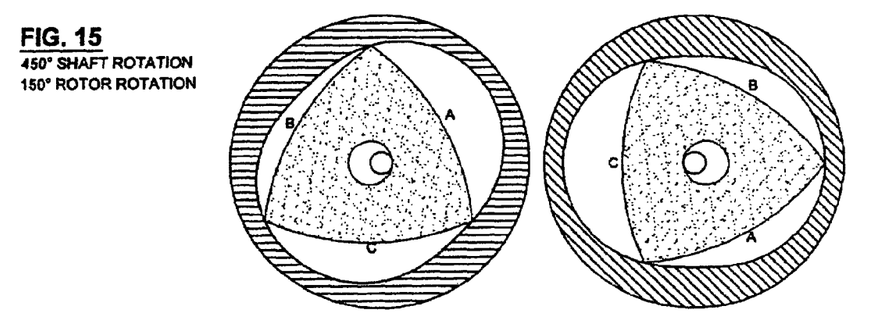

FIG. 15 shows the crankshaft rotated another 45°. Air mass 'C' finishes Power Expansion and begins Expansion Cooling.

Figure 16:
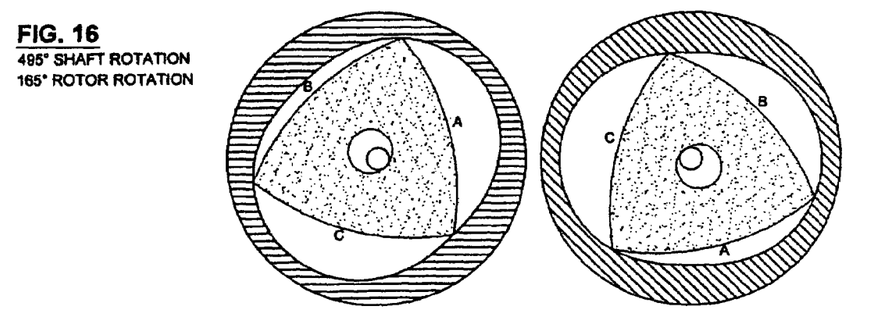

FIG. 16 shows the crankshaft rotated another 45°. Air mass 'B' completes Compression Heating and begins Power Expansion.

Figure 17:
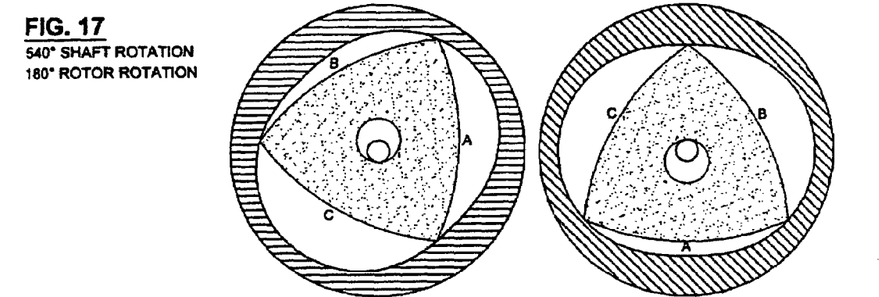

FIG. 17 shows the crankshaft rotated another 45°. Air mass 'A' finishes Power Contraction and begins Compression Heating.

Figure 18:
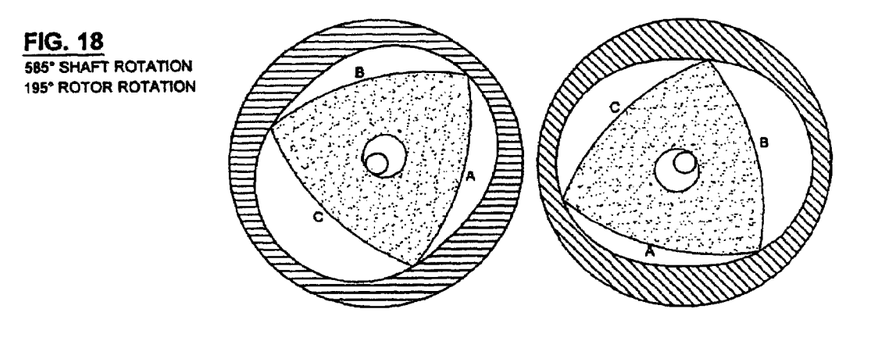

FIG. 18 shows the crankshaft rotated another 45°. At this point air mass 'C' completes Expansion Cooling and begins Power Contraction.

Figure 19:
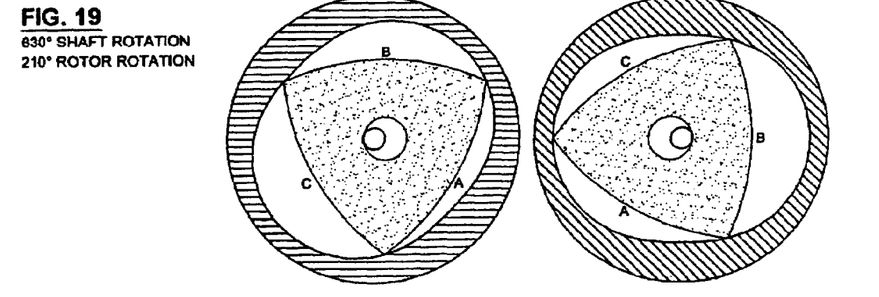

FIG. 19 shows the crankshaft rotated another 45°. Air mass 'B' completes Power Expansion and begins Expansion Cooling.

Figure 20:
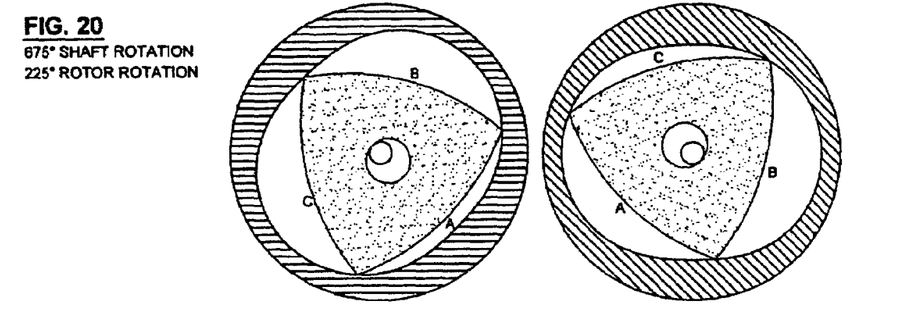

FIG. 20 shows the crankshaft rotated another 45°. Air mass 'A' completes Compression Heating and begins Power Expansion.

Figure 21:
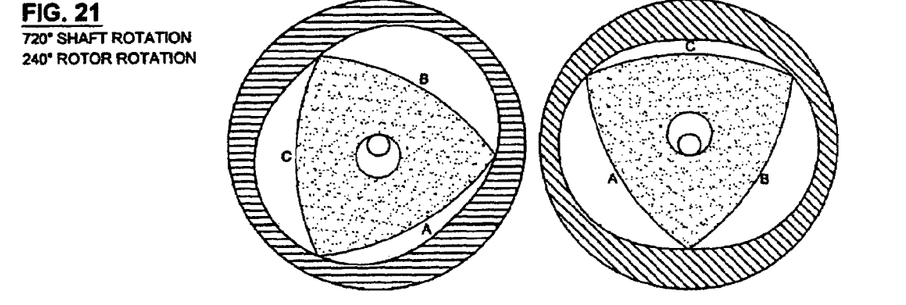

FIG. 21 shows the crankshaft rotated another 45°. It has now completed two full rotations. Air mass 'C' finishes Power Contraction and begins Compression Heating.

Figure 22:
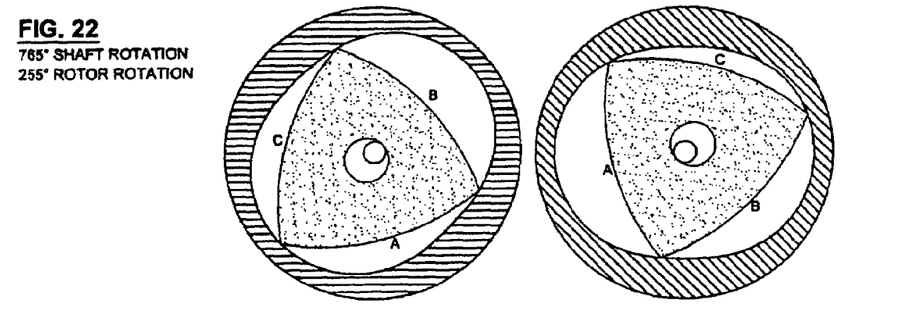

FIG. 22 shows the crankshaft rotated another 45°. At this point air mass 'B' completes Expansion Cooling and begins Power Contraction.

Figure 23:
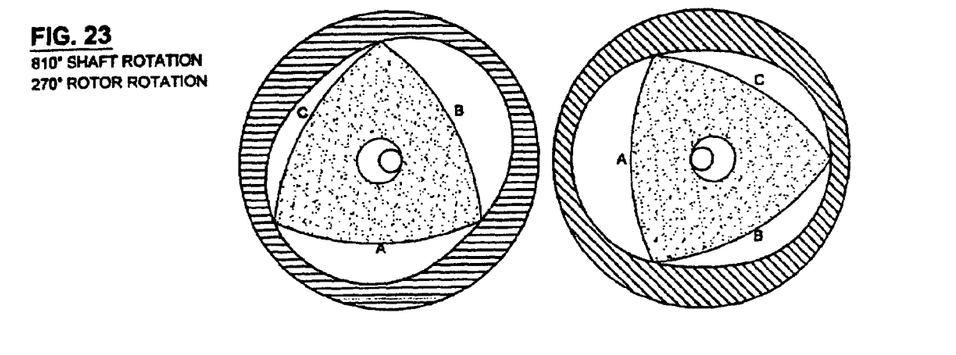

FIG. 23 shows the crankshaft rotated another 45°. Air mass 'A' completes Power Expansion and begins Expansion Cooling.

Figure 24:
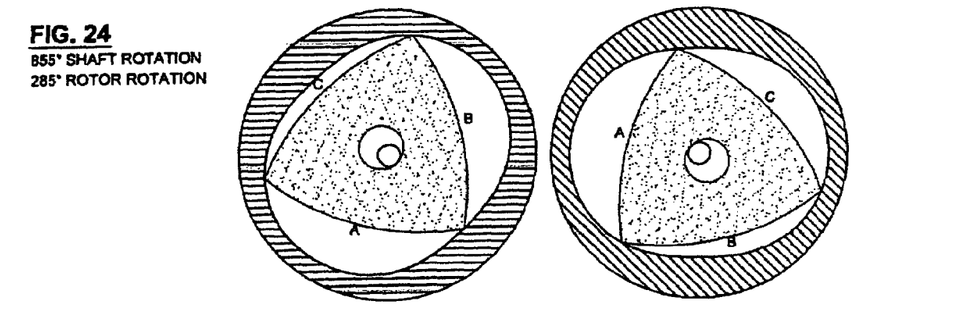

FIG. 24 shows the crankshaft rotated another 45°. Air mass 'A' completes Compression Heating and begins Power Expansion.

Figure 25:
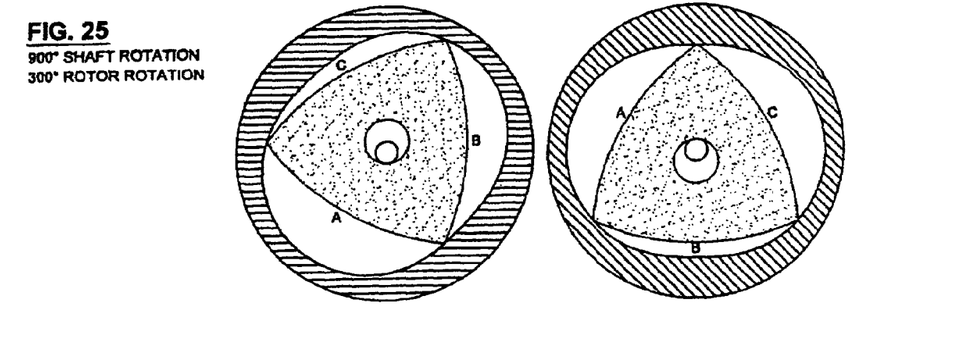

FIG. 25 shows the crankshaft rotated another 45°. Air mass 'B' finishes Power Contraction and begins Compression Heating.

Figure 26:
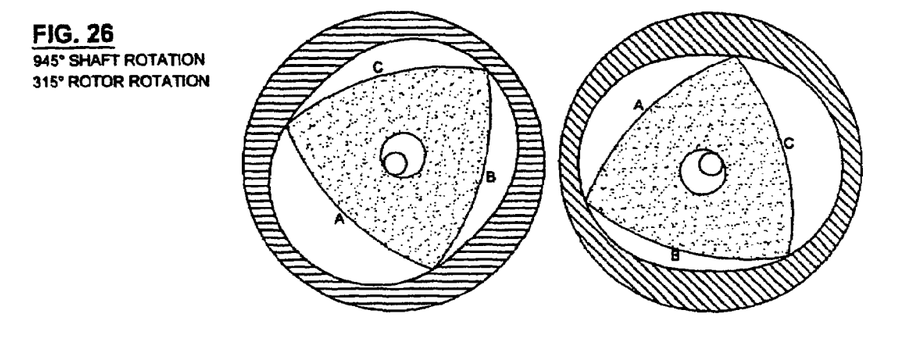

FIG. 26 shows the crankshaft rotated another 45°. At this point air mass 'A' completes Expansion Cooling and begins Power Contraction.

Figure 27:
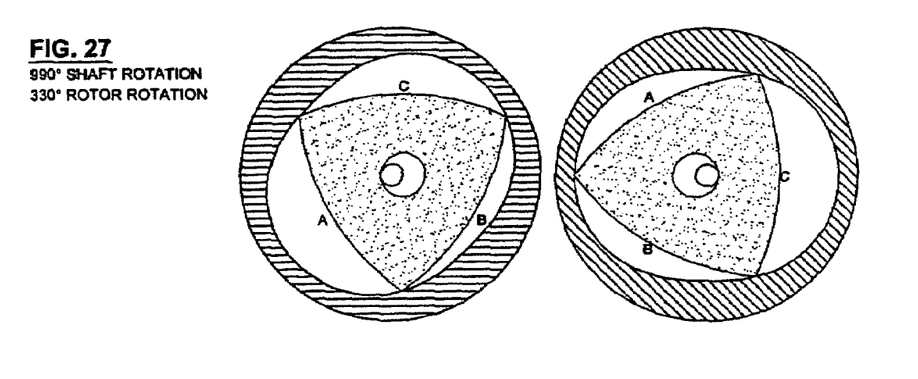

FIG. 27 shows the crankshaft rotated another 45°. Air mass 'C' completes Power Expansion and begins Expansion Cooling.

Figure 28:
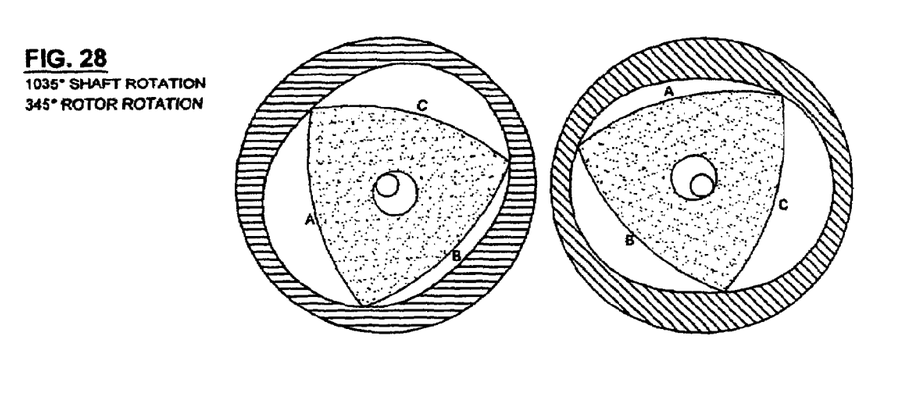
Figures 29A, 29B:
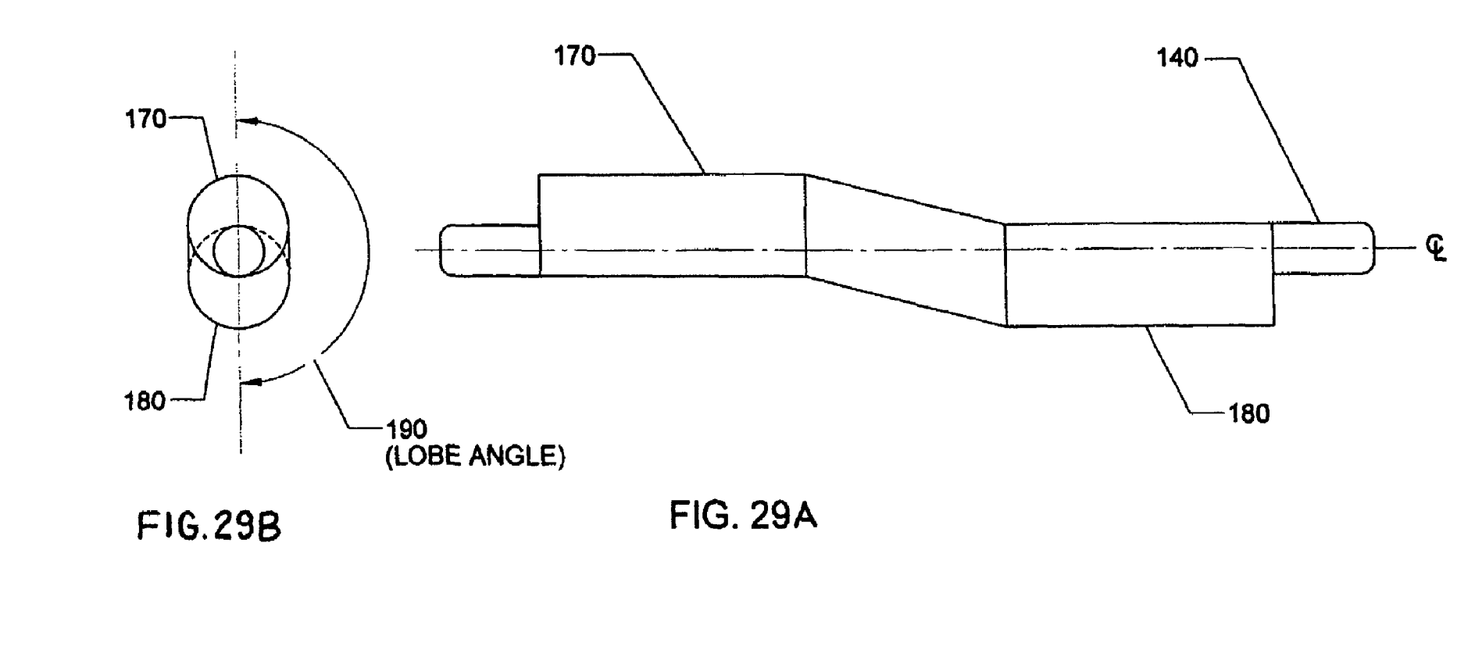
FIGS. 29A and 29B are side and end views of the crankshaft of the machine.

FIG. 28 shows the crankshaft rotated another 45°. Air mass 'B' completes Compression Heating and begins Power Expansion. This is the last distinct stage of the cycle. The crankshaft travels another 45° returning to the original position (FIG. 5) to repeat the cycle again. The process will continue until there is no longer a difference in temperature between the Hot and Cold Housings.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A rotary machine operating upon a compressible working fluid, comprising:
   a rotary expander having a hot side housing with a heat input interface, a hot side rotor having rotor passages adapted to allow passage of the working fluid between the rotor hub and rotor face, heated chambers formed between the rotor face and the hot side housing;
   a rotary compressor having a cold side housing with a heat rejection interface, a cold side rotor having rotor passages adapted to allow passage of the working fluid between the rotor hub and rotor face, cooled chambers formed between the rotor face and the cold side housing;
   a shaft, adapted to rotatably couple the rotor hub of the hot side rotor and the rotor hub of the cold side rotor, the shaft having shaft passages adapted to allow passage of the working fluid between the heated chambers and the cooled chambers;
   the working fluid sealed in the machine;
   a rotating union adapted to interface between the rotor hub of the hot side rotor and the shaft, the rotating union adapted to provide a substantially continuous passage between the rotor passages and the shaft passages; and
   a rotating union adapted to interface between the rotor hub of the cold side rotor and the shaft, the rotating union adapted to provide a substantially continuous passage between the rotor passages and the shaft passages;
   wherein the machine operates under the Carnot cycle.

2. The machine of claim 1, wherein the hot side housing and the cold side housing are relatively offset by a housing angle.

3. The machine of claim 2, wherein the housing angle is 45 degrees.

4. The machine of claim 1, wherein the crankshaft comprises an eccentric hot side lobe for receiving the hot side rotor and a n eccentric cold side lobe for receiving the cold side rotor.

5. The machine of claim 4, wherein the hot side lobe and the cold side lobe are relatively offset by a lobe angle.

6. The machine of claim 5, wherein the lobe angle is substantially 180 degrees.

7. The machine of claim 1, wherein the hot side housing and the cold side housing have outer walls described by an epitrochoidal arc with "n" number of lobes.

8. The machine of claim 7, wherein the machine contains two rotors, each having n+1 rotor faces.

9. The machine of claims 7, wherein n=2.

10. The machine of claim 7, wherein the rotors rotate about the offset lobes of the shaft at 1/n times the rate that the crankshaft rotates within the machine.

11. The machine of claim 7, wherein the shaft, rotors, and housings are adapted to sealingly form n+1 separate volumes of the working fluid that do not mix or exchange during operation of the machine.

12. The machine of claim 1, adapted to operate as an engine.

13. The machine of claim 1, adapted to operate as a heat pump.

14. The machine of claim 1, further comprising a regenerative matrix within the shaft passages.

15. The machine of claim 14, wherein the regenerative matrix comprises metal pellets, screen, or steel wool.

16. The machine of claim 1, wherein the cooled chambers and heated chambers are of different sizes, proportion, or configuration.

17. The machine of claim 1, comprising a plurality of cooled chambers, heated chambers, -hot side rotors, and cold side rotors.

18. The machine of claim 1, wherein the rotor faces are convex.

* * * * *